United States Patent [19]

Kodama et al.

[11] Patent Number: 4,967,349
[45] Date of Patent: Oct. 30, 1990

[54] DIGITAL SIGNAL PROCESSOR SUITABLE FOR EXTACTING MINIMUM AND MAXIMUM VALUES AT HIGH SPEED

[75] Inventors: Kazuyuki Kodama, Nishitama; Hirotada Ueda, Kokubunji; Kenji Keneko, Sagamihara; Yoshimune Hagiwara, Hachioji; Hitoshi Matsushima, Tachikawa, all of Japan

[73] Assignee: Hitachi, Ltd., Tokyo, Japan

[21] Appl. No.: 140,792

[22] Filed: Jan. 5, 1988

[30] Foreign Application Priority Data

Jan. 16, 1987 [JP] Japan .................................... 62-7504

[51] Int. Cl.$^5$ ............................................... G06F 9/22
[52] U.S. Cl. .................... 364/200; 364/259; 364/259.9; 364/262.4; 364/262.8
[58] Field of Search ... 364/200 MS File, 900 MS File, 364/715.06

[56] References Cited

U.S. PATENT DOCUMENTS 4,041,461  8/1977  Kratz et al. ........................ 364/200
4,068,299  1/1978  Bachman ............................ 364/200
4,511,966  4/1985  Hamada ............................. 364/200
4,689,738  8/1987  Wijk et al. ......................... 364/200
4,774,688  9/1988  Kobayashi et al. ........ 364/715.06 X Primary Examiner—Raulfe B. Zache
Attorney, Agent, or Firm—Antonelli, Terry, Stout & Kraus

[57] ABSTRACT

A digital signal processor for determining the maximum and minimum values of a plurality of data items wherein operations of an arithmetic logic unit and data memories are controlled by micro-instructions, including a device for decoding specified bits of an operand of the micro-instruction, a device for detecting a value of a condition code which has been designated by an output of the decoding device, and a control device for executing a logical operation between the output of the detection device, which becomes "1" if the value of the condition code is true, and a decoded value of an operation code of the micro-instruction and to generate a control signal for the arithmetic logic unit on the basis of a result of the logical operation.

14 Claims, 4 Drawing Sheets

DIGITAL SIGNAL PROCESSOR SUITABLE FOR EXTACTING MINIMUM AND MAXIMUM VALUES AT HIGH SPEED

BACKGROUND OF THE INVENTION

The present invention relates to a digital signal processor for use in image processing, speech processing, etc., and more particularly to a digital signal processor which is well suited to extract the maximum value from among a group of numerical values or the minimum value at high speed.

With a prior art digital signal processor, the maximum value has been found from among several numerical values stored in a data memory (DM) performing micro-instructions CMP (compare), LDA (load accumulator) and JMP (jump) as follows:

```
    LDA n                        (1)
  B CMP(ACC) - (DM_ADR=i)        (2)
    JMP A IF CCR(NS)             (3)
    LDA(DM_ADR=i)                (4)
  A i = i + 1                    (5)
    JMP B                        (6)
```

Here, instructions (1) signifies to load an accumulator (ACC) with n which is the least value. In instruction (2), B denotes the address of the memory in which the micro-instruction is stored, and the comparison between the value of the ACC and the numerical value of the address i of the DM is signified. An operation for the comparison is (value of ACC) −(value of DM, address i). instruction (3) signifies that, if the sign flag of a condition code register (CCR) is 0, that is, the result of the CMP operation is $\geqq 0$, the control jumps to address A. If the result of the CMP operation is <0, the next instruction instruction (4) is executed. (4) signifies to load the ACC with the value of the DM, address i. instruction (5) signifies to increment the address of the DM by one, and instruction (6) signifies to jump to the address B. In this way, the maximum value of the several numerical values stored in the DM has been obtained.

On the other hand, the minimum value has been found as follows:

```
    LDA n                        (7)
  B CMP(ACC) - (DM_ADR=i)
    JMP A IF CCR(S)              (8)
    LDA(DM_ADR=i)
  A i = i + 1
    JMP B
```

Here, instruction (7) signifies to load the ACC with the largest value. instruction (8) signifies that, if the sign flag of the CCR is 1, that is, (ACC) $(DM_{ADR=i})$ <0, the control jumps to the address A.

Relevant to the processor of this type is digital signal processor TMS 32010 of Texas Instruments (TMS 32010 User's Guide 1984, TEXAS INSTRUMENTS).

SUMMARY OF THE INVENTION

For precisely performing, for example, the spectrum analysis (FFT) of sampled input waveform data in speech processing or image processing, it is important to extract the maximum or minimum value of the data items and normalize it. However, when the maximum value is extracted by the use of the prior art, 3–4 instruction cycles employing the micro-instructions CMP, JMP and LDA are required, and for a 1 k-point FFT, by way of example, a processing time of 3 k–4 k dynamic steps is needed.

The present invention has been made in view of the above circumstances, and has for its object to provide a digital signal processor in which basic processing for extracting the maximum value or minimum value from among a large number of data items stored in a data memory can be executed at high speed.

The aforementioned object is accomplished by a digital signal processor wherein operations of an arithmetic logic unit and data memories are controlled by micro-instructions, characterized by a device for decoding specified bits of an operand of the micro-instruction, a device for detecting value of a condition code which has been designated by an output of the decoding device, and a control device for executing a logical operation between the output of the detection device, which becomes "1" if the value of the condition code is true, and a decoded value of an operation code of the micro-instruction and for generating a control signal for the arithmetic logic unit on the basis of a result of the logical operation, or characterized by a device for detecting a value of a condition code which has been designated by specified bits of an operand of the micro-instruction, and control device for executing a logical operation between the output of the detection device and a decoded value of an operation code of the micro-instruction and for generating a control signal for the arithmetic logic unit on the basis of a result of the logical operation.

With a first digital signal processor according to the present invention, regarding specified instructions, the value of the condition code described in the operand of the micro-instruction is detected by the decoding device and the detection device.

When informed of the CLDA (compare with load accumulator) instruction by the decoding device, the control device alters the operation mode of the arithmetic logic unit to LDA (load accumulator) or NOP (no-operation) in accordance with the value of the condition code.

Thus, basic processing for obtaining, for example, the maximum value becomes:

CMP (ACC)−(DM)

(the values of ACC and DM are compared, and the content of the ACC is not changed)

CLDA (DM), CCR (S)

and can be executed by 2 instruction cycles.

Also, a second digital signal processor according to the present invention dispenses with the device for decoding the operand as compared with the first processor. It detects, the value of the condition code which has been designated the specified bits of the operand of the micro-instruction, and the subsequent operations thereof are similar to those of the first digital signal processor

DESCRIPTION OF THE PREFERRED EMBODIMENTS

Now, embodiments of the present invention will be described in connection with the drawings.

Figure 1:
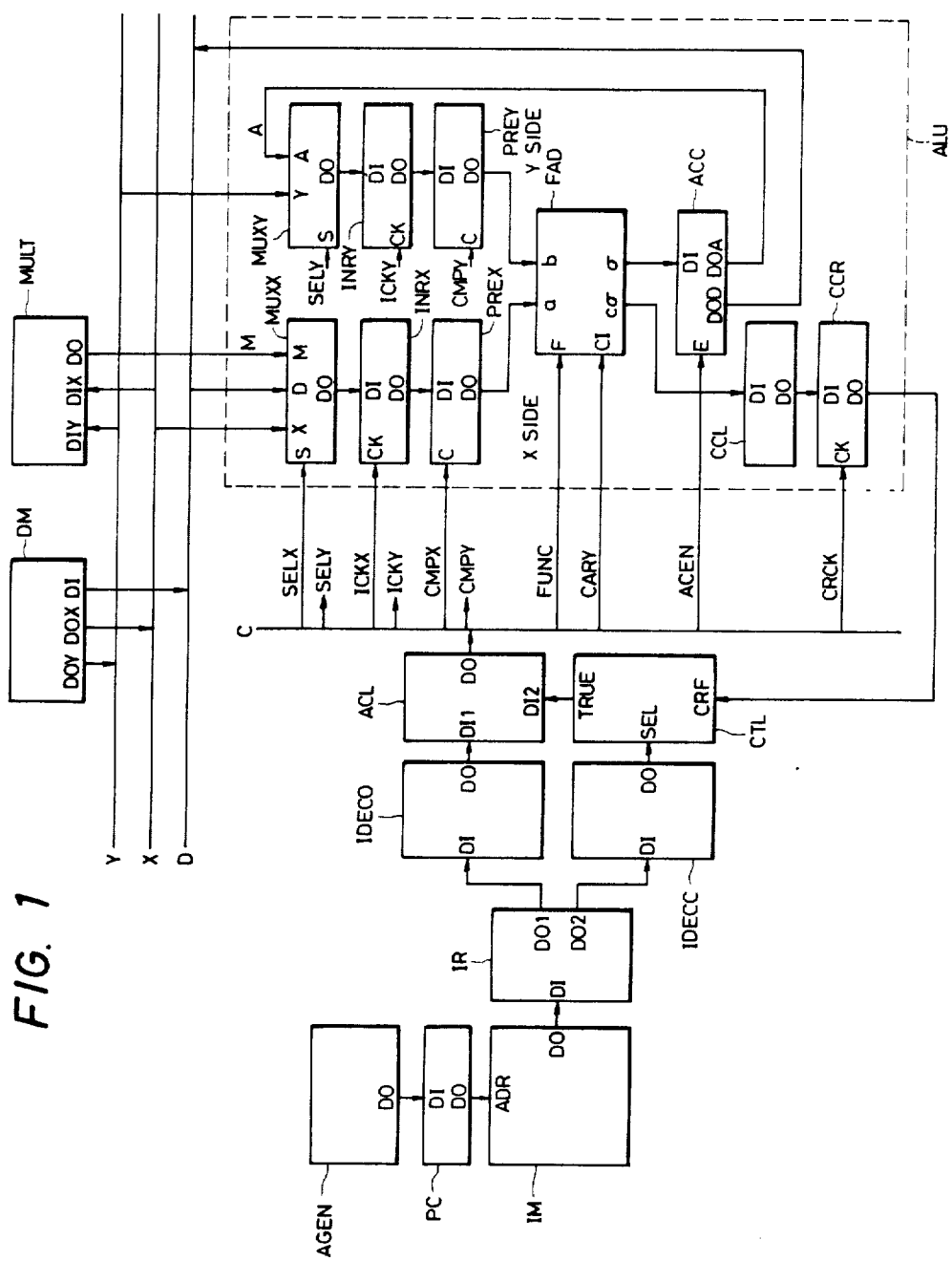
FIG. 1 is an architectural diagram of a digital signal processor showing an embodiment of the present invention.

FIG. 1 is an architectural diagram of a digital signal processor showing an embodiment of the present invention. Referring to the figure, IM indicates an instruction memory (e.g., a RAM or ROM) in which micro-instructions are stored, and which has an address input terminal ADR and a data output terminal DO. AGEN indicates an address generator which generates an address for fetching the instruction from the instruction memory IM, and PC a program counter which latches the output of the address generator AGEN. With or in this program counter PC, the output of the address generator AGEN is subjected to a +1 increment every operation instruction, and the value of an operand is set for a jump instruction.

IR indicates an instruction register which latches the micro-instruction, and IDEC indicates decoders which interpret an operation code and the source operand of data to enter an arithmetic logic unit, a destination operand for storing an operated result, etc. DM denotes a data memory, the data input terminal DI of which is connected to one output of an ACC through D (D-bus of, e. g., 16 bits) and the data output terminals DOX and DOY of which are respectively connected to the input terminals of the ALU etc. through X (X-bus of, e. g., 16 bits) and through Y (Y-bus of, e. g., 16 bits).

MULT denotes a multiplier, the output M of which is input from the data output terminal DO to the ALU. The ALU stands for the arithmetic logic unit which executes arithmetic and logical operations, and in which an operated result is usually stored in the accumulator ACC, while the statuses (sign S, zero Z, overflow O and carry C) of a numerical value after the operation are stored in a condition code register (CCR).

Before describing the principal constituents IDECC, CTL and ACL of the present invention, circuits within the broken line constituting the ALU in FIG. 1 will be explained.

First, as to a data input part and a preprocessing part, a section extending along MUXX −INRX −PREX −input terminal a of FAD shall be determined as an X-side, while a section extending along MUXY−IN-RY−PREY−input terminal b of the FAD shall be determined as a Y-side. MUXX and MUXY denote multiplexers for input data, and they select the input data for the ALU in accordance with select signals SELX and SELY applied to the S terminals thereof. More specifically, the relationships between the S-terminal inputs and DO-terminal outputs of the multiplexers are as follows:

| SELX | MUXX DO |
|------|---------|
| 00   | 0 (zero) |
| 01   | X |
| 10   | D |
| 11   | M |

| SELY | MUXY DO |
|------|---------|
| 01   | 0 (zero) |
| 01   | 0 (zero) |

| | -continued |
|---|---|
| 10 | Y |
| 11 | A |

The constituents INRX and INRY are registers which latch the input data, and they gather the outputs of the multiplexers MUX when clock signals ICKX and ICKY applied to the CK terminals thereof are "1," respectively. The pre-processing circuits PREX and PREY deliver the 1's complements of inputs DI to the DO terminals thereof when C-terminal input signals CMPX and CMPY are "1," respectively, while they deliver the inputs DI left intact to the terminals DO when the input signals are "0."

In addition, the full adder FAD executes the following operations in accordance with input signals FUNC for controlling the operation mode thereof.

| FUNC | Operation | Output δ |
|------|-----------|----------|
| 0001 | Full addition | $a + b + CI$ |
| 0010 | AND | $a \cdot b$ |
| 0100 | OR | $a + b$ |
| 1000 | EOR | $a \oplus b$ |

Here, CI indicates a carry input.

The accumulator ACC latches the operated result, and it operates as follows in accordance with control signals ACEN applied to the terminal E thereof:

| ACEN | Operation |
|------|-----------|
| **1  | Latching input DI. |
| *1*  | Outputting data from DOA to A-bus. |
| 1**  | Outputting data from DOD to D-bus. |

Here, mark * represents "Don't Care Condition."

Figure 3:
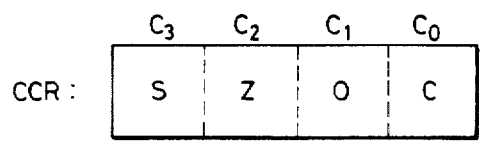
FIG. 3 is a diagram showing the four statuses of a condition code register.

CCL indicates a circuit for obtaining the statuses of the operated result, namely, the sign S, zero Z, overflow 0 and carry C. The condition code register CCR gathers the aforementioned four statuses when a CK input signal CRCK is "1." This is illustrated in FIG. 3.

Figure 2:
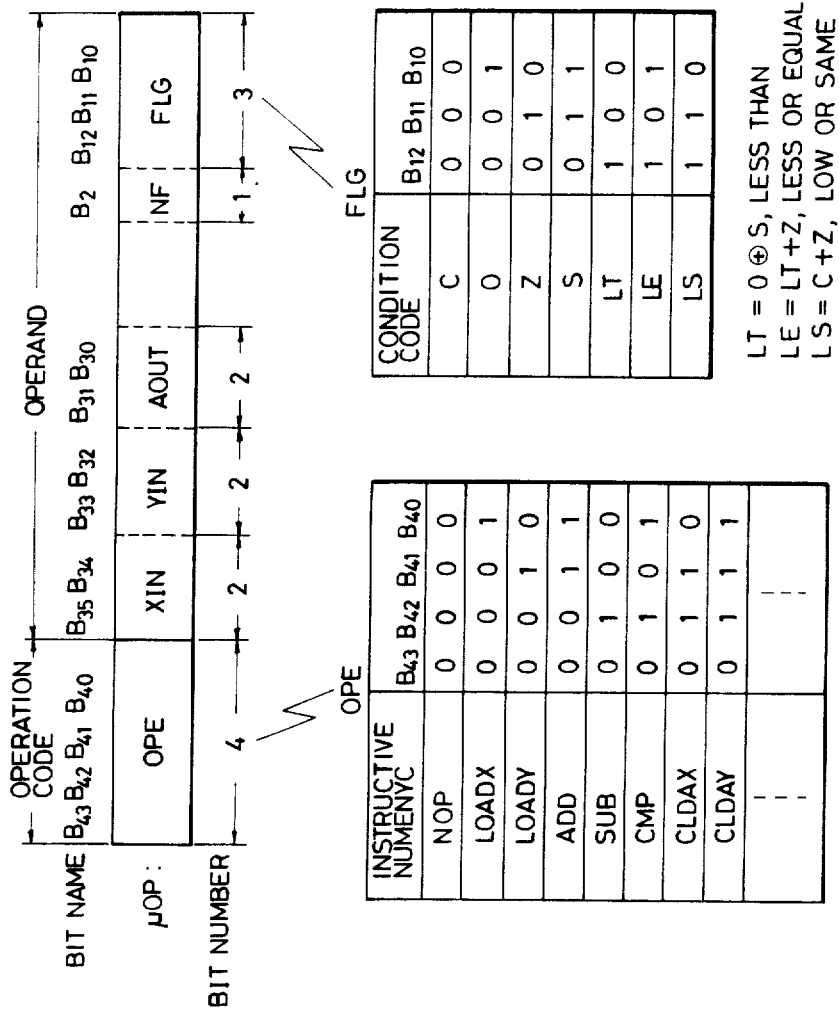
FIG. 2 is a diagram showing the format of micro-instructions.

Next, the principal constituents IDECC, CTL and ACL of the present invention will be described with reference to FIGS. 1-4. In FIG. 1, the constituent IDECC is a decoder, the input terminal DI of which receives part of the micro-instruction and the output terminal DO of which delivers a decoded result. FIG. 2 shows the format of the micro-instruction μOP. The flag FLG (3 bits of $B_{12}$, $B_{11}$ and $B_{10}$) of the operand of the instruction μOP is input to the decoder IDECC.

In a CLDA instruction ("compare with load accumulator" instruction to be described in detail later), the number designating a condition code is written down in the part FLG as shown in the figure. By way of example, if ($B_{12}B_{11}B_{10}$) is (011), the sign S is designated. The decoded result of the part FLG is input to the constituent CTL stated below.

Figure 4:
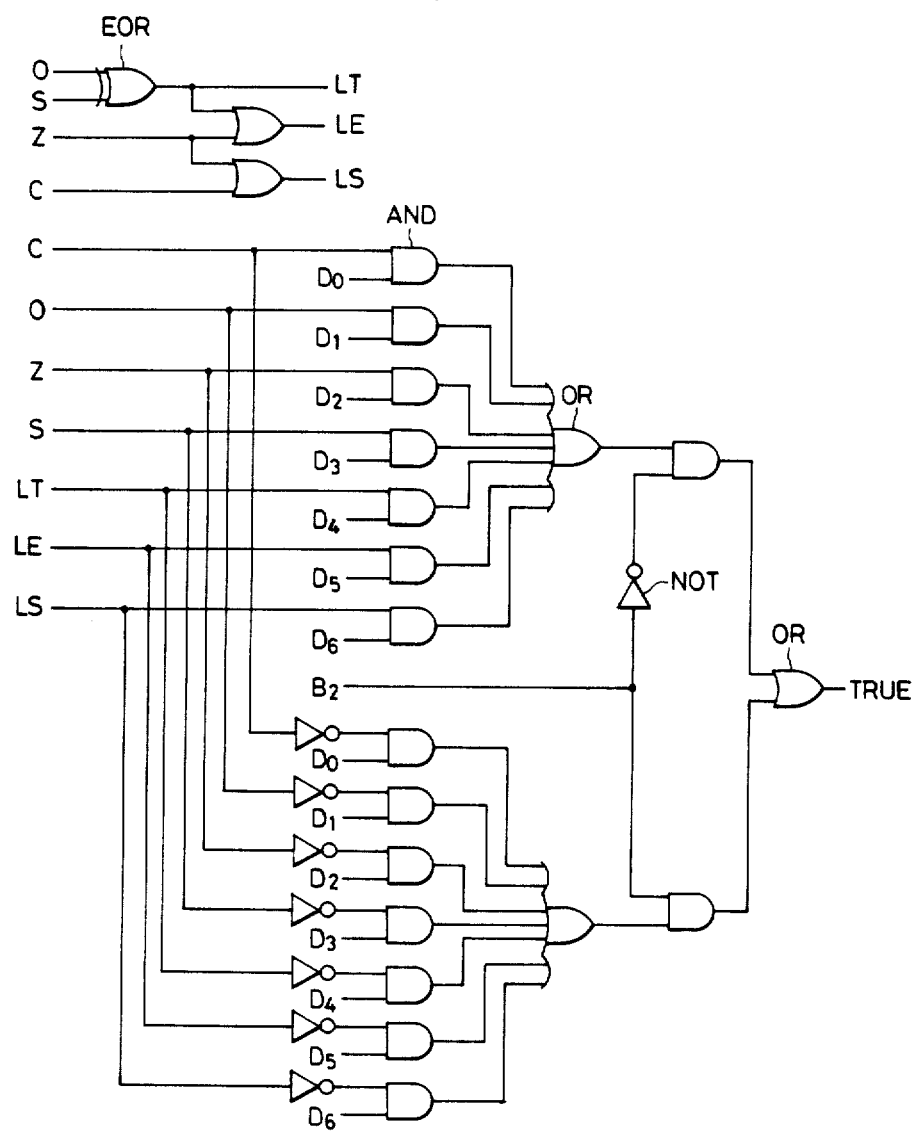
FIG. 4 is a detailed diagram showing an example of an arrangement of a detection circuit.

Next, the constituent CTL in FIG. 1 is the detection means, which has the function of extracting the value of the condition code designated by the FLG part of the micro-instruction μOP. The SEL terminal of the detection means CTL is supplied with the output of the decoder IDECC and the NF part (bit $B_2$) of the instruction μOP, and the CRF terminal thereof is supplied with the output of the register CCR. The detailed arrangement of the detection means CTL is shown in FIG. 4. In FIG. 4, signals S, Z, O and C are the statuses of the ALU operation result based on the preceding instruction as stored in the register CCR in FIG. 3, $D_0$–$D_6$ denote signals for designating the condition codes ($D_0$ corresponds to the code C of the flag FLG in FIG. 2, $D_1$ to the code O, ....), $B_2$ denotes the $B_2$ bit of the instruction µOP, and LT, LE and LS denote condition codes having significances different from those of the values of the register CCR as indicated in FIG. 2. As the operation of the detection means CTL, if NF=0 and FLG=011 are designated by the instruction µOP and S=1 holds in the register CCR by way of example, TRUE=1 is established. It should be noted that detection means of CTL may be constructed of flip-flops or may include a RAM.

The constituent ACL in FIG. 1 is a control circuit, which executes the logical operation between the output of the decoder IDECO and the output TRUE of the detection means CTL and delivers a control signal for the ALU to C (C-bus). The contents of the logical operations will be explained on only 8 instructive mnemonic codes listed at OPE in FIG. 2. Bits $B_{10}$–$B_{35}$ denotes the bits of the instruction µOP in FIG. 2. LOADX and CLDAX express the loading of the ACC with the input data of the X-side, while LOADY and CLDAY express the loading of the ACC with the data of the Y-side. In addition, the operations of SUB and CMP shall be (Y-side −X side).

$SELX_0 = B_{34} \cdot$ (LOADX + ADD + SUB + CMP +

CLDAX · TRUE)

$SELX_1 = B_{35} \cdot$ (LOADX + ADD + SUB + CMP +

CLDAX · TRUE)

$SELY_0 = B_{32} \cdot$ (LOADY + ADD + SUB + CMP +

CLDAY · TRUE)

$SELX_1 = B_{33} \cdot$ (LOADY + ADD + SUB + CMP +

CLDAY · TRUE)

ICKX = ICKY
= LOADX + LOADY + ADD + SUB + CMP +
(CLDAX + CLDAY) · TRUE
CMPX = SUB + CMP
CMPY = 0
$FUNC_0$ = NOP + LOADX + LOADY + ADD + SUB +

CMP + CLDAX + CLDAY $FUNC_1$ = $FUNC_2$ = $FUNC_3$ = 0
CARY = SUB + CMP
$ACEN_0$ = LOADX + LOADY + ADD + SUB +

(CLDAX + CLDAY) · TRUE $ACEN_1 = B_{30} \cdot$ (ADD + SUB + CMP)
$ACEN_2 = B_{31} \cdot$ (NOP + LOADX + LOADY + ADD +

SUB + CMP + CLDAX + CLDAY)

CRCK = LOADX + LOADY + ADD + SUB +

CMP + (CLDAX + CLDAY) · TRUE

In each of these logical expressions, the left-hand side indicates the ALU control signal, and the right-hand side indicates the condition under which the control signal becomes "1" (true). Mark·denotes a logical AND, and mark+a logical OR. For example, $SELX_0$ denotes 1 bit of a signal for selecting data to enter the X-side of the ALU, and $SELX_0=1$ holds if the bit $B_{34}$ of the micro-instruction instruction operand is "1," and if one of the CLDAX instruction with the output signal TRUE of the means CTL, the LOADX instruction, the ADD instruction, the SUB instruction or the CMP instruction is "1."

In this manner, the control circuit ACL executes the logical operations between the decoded values of the operation codes OPE and the TRUE signals of the condition codes and delivers the ALU control signals such as the latch clock $ACEN_0$ of the accumulator ACC.

The architecture is as thus far stated. Now, the motions of the ALU will be described along instructions for finding the maximum and minimum values. In the present embodiment, basic processing for comparing two numbers expressed by 2's complements and obtaining, for example, the larger numerical value in the accumulator ACC is achieved by:

CMP (ACC)−(DM)

CLDAX (DM), CC (S)

In terms of a machine language, this is expressed as follows (refer to FIG. 2):

| OPE | XIN | YIN | AOUT | NF | FLG |
|------|-----|-----|------|----|-----|
| 0101 | 01  | 11  | *1   | *  | *** |
| 0110 | 01  | **  | **   | 0  | 011 |

First, in the CMP instruction, owing to XIN =(01), the control circuit ACL provides:

$SELX_0 = 1$ $SELX_1 = 0$ (these are collectively described as SELX=(01))
Owing to YIN=(11), SELY=(11)
and further,

ICKX=ICKY=1

CMPX=1

CMPY=0

FUNC=(0001)

CARY=1

$ACEN_0=0$

Owing to AOUT=(*1), $ACEN_1=1$ $ACEN_2=x$
and further,

CRCK=1

These are respectively delivered to the ALU. Thus, in the ALU, the following operations are executed:
ACC outputs its content to A-bus,
MUXX selects X-bus,
MUXY selects A-bus,
INRX latches value of X-bus (value fetched from DM, and expressed as (DM)), INRY latches value of A-bus (expressed by (ACC)),
PREX turns (DM) into 1's complement ($\overline{DM}$),
FAD executes $\delta=(ACC)+(\overline{DM})+1$, namely, $\delta=(ACC)-(DM)$, and
CCR stores the statuses (sign S etc.) of the operated result.

Since $ACEN_0 = 0$ holds, the above output $\delta$ is not latched in the accumulator ACC, but the preceding value is held therein.

Among the condition codes, the sign S is "1" if the operated result is negative $((ACC)<(DM))$. and it is "0" if the result is not negative $((ACC)\geq(DM))$.

Subsequently, in the CLDAX instruction, FLG =(011) is decoded by the decoder IDECC, with the result that $D_{3=1}$ is obtained, and $NF=B_2=0$ holds. In accordance with the condition code S applied from the register CCR, therefore, the detection means CTL delivers the following to the control circuit ACL (refer to FIG. 4):

TRUE = 1 for S = 1

TRUE = 0 for S = 0

The control circuit ACL supplies the ALU with the following signals:

| Names of Control signals | TRUE = 1 | TRUE = 0 |
|---|---|---|
| SELX | (01) | (00) |
| SELY | (00) | (00) |
| ICKX | 1 | 0 |
| ICKY | 1 | 0 |
| CMPX | 0 | 0 |
| CMPY | 0 | 0 |
| FUNC | (0001) | (0001) |
| CARY | 0 | 0 |
| $ACEN_0$ | 1 | 0 |
| $ACEN_1$ | 1 | 0 |
| $ACEN_2$ | x | x |
| CRCK | 1 | 0 |

Thus, the ALU executes the following operations:

| Constituent | TRUE = 1 | TRUE = 0 |
|---|---|---|
| MUXX | SELX bus | SEL"0" data |
| MUXY | SEL"0" data | SEL"0" data |
| INRX | Latching (DM) | (Holding previous value) |
| INRY | Latching "0" | (Holding previous value) |
| PREX | Through | Through |
| PREY | Through | Through |
| FAD | $\delta = 0 + (DM)$ = (DM) | ($\delta$ = (ACC) + (DM)) |
| ACC | Latching (DM) | (Holding previous value) |

That is, in the CLDAX instruction, if the designated condition code is:

TRUE (namely, S=0, (ACC)<(DM)), then (DM) is loaded in the ACC, and if the condition code is:

$\overline{TRUE}$ (namely, S=0, (ACC)$\geq$(DM)), then the preceding value is held in the ACC.

With the CMP instruction and the subsequent CLDAX instruction, accordingly, the magnitudes of the two numbers can be compared so as to obtain the larger numerical value in the ACC.

In the case of finding the smaller numerical value of the two numbers, basic processing proceeds as:

CMP (ACC)−(DM)

CLDAX (DM), CC ($\overline{S}$)

which are coded in terms of a machine language as:

| OPE | XIN | YIN | AOUT | NF | FLG |
|---|---|---|---|---|---|
| 0101 | 01 | 11 | *1 | * | *** |
| 0110 | 01 | ** | ** | 0 | 011 |

Thus, in the CLDAX instruction, owing to $NF=B_2=1$, for S=0 ((ACC)$\geq$(DM)), TRUE holds, and the ACC is loaded with (DM), and for S=1 ((ACC)<(DM)), $\overline{TRUE}$ holds, and the ACC holds the preceding value.

With the two instructions CMP and CLDAX, accordingly, the smaller numerical value in the two numbers can be obtained in the ACC.

A program in which, using these basic instructions, the maximum value is obtained from among N numerical values in the 2's complement expression, becomes as follows:

| |
|---|
| ACC ← −1 |
| DMADR ← 0 |
| DO A N |
| Read DM |
| CMP (ACC) - (DM) |
| CLDAX (DM), CC(S) |
| A  DMADR ← DMADR + 1 |

Figure 5:
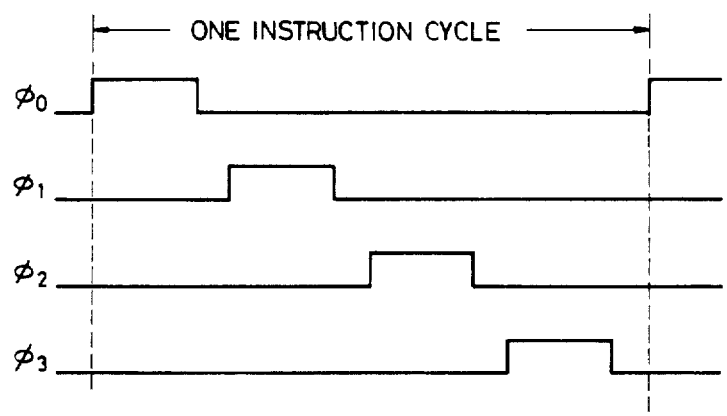
FIG. 5 is an operation timing chart of an embodiment.

Lastly, the operation timings of the ALU will be supplementarily described with reference to a time chart shown in FIG. 5.

One instruction shall be ended by $\phi_0-\phi_3$.3 At the timing $\phi_0$, the following is performed:

Decoding $\mu OP$

Logical operation of CTL, ACL

Outputting ACC, DM

Selections of MUXX, MUXY

INRX and INRY operate at the timing $\phi_1$, and PREX, PREY and FAD operate at the timing $\phi_2$. ACC, CCR latches are performed at the timing $\phi_3$.

In the above embodiment, the example employing an means to decode the specified bits of the has been described. Another embodiment can be constructed so that the specified bits of the operands of micro-instructions correspond to condition codes in 1-to-1 fashion, respectively, and so that the specified bits of the operand are directly applied to detection means without requiring the decode means.

As described above, according to the present invention, a digital signal processor wherein operations of an arithmetic logic unit and data memories are controlled by micro-instructions is characterized by means to decode specified bits of an operand of the micro-instruction, means to detect a value of a condition code designated by an output of the decode means, and control means to execute a logical operation between the output of the detection means and a decoded value of an operation code of said micro-instruction and to generate a control signal for the arithmetic logic unit on the basis of a result of the logical operation, or it is characterized by means to detect a value of a condition code designated by specified bits of an operand of the micro-instruction, and control means to execute a logical operation between the output of the detection means and a decoded value of an operation code of the micro-instruction and to generate a control signal for the arithmetic unit on the basis of a result of the logical operation, whereby a digital signal processor capable of executing at high speed the basic processing for extracting the maximum value or minimum value to compare two numbers and load an accumulator with the larger numerical value or smaller numerical value, by the use of two instructions, can be realized, to achieve the remarkable effect that the processing time can be shortened to ½-⅛ in comparison with that of the prior art digital signal processors.

What is claimed is:

1. A digital signal processor for extracting a maximum value or a minimum value from a plurality of data items, comprising:
   a data memory for storing a plurality of data from which a maximum value or a minimum value is extracted;
   an arithmetic logic unit for extracting a predetermined arithmetic and logical operation, said arithmetic logic unit including an accumulator for storing an operation result and a condition code register for storing a status of a numerical value after the operation;
   an instruction memory for storing micro-instructions, said data memory and said arithmetic logic unit being controlled by the micro-instructions;
   detection means for detecting a value of a condition code from said condition code register designated by a decoded value of predetermined bits of an operand of the micro-instructions; and
   control means for generating a control signal for said arithmetic logic unit by executing a logical operation between an output of said detection means and a decoded value of an operation code of the micro-instructions, whereby said control means changes an operation mode of said arithmetic logic unit to a load accumulator mode or a no-operation mode in accordance with the designated value of the condition code when the decoded value of the operation code of the micro-instructions indicates a load accumulator comparison.

2. A digital signal processor as defined in claim 1, wherein the predetermined bits of the operand of the micro-instructions consist of a group of bits for designating the condition code, and a single bit for designating whether a true value or false value of the condition code is to be detected; a decode means is supplied with the group of bits; and said detection means is supplied with an output of the decode means and the single bit, thereby to detect the designated true or false value of the condition code.

3. A digital signal processor as defined in claim 1, wherein the predetermined bits of the operand of the micro-instructions consist of a group of bits for designating the condition code, and a single bit for designating whether a true value or false value of the condition code is to be detected; and said detection means detects the designated true or false value of the condition code.

4. A digital signal processor as defined in claim 1, wherein the micro-instructions are stored in a random access memory.

5. A digital signal processor as defined in claim 1, wherein the micro-instructions are stored in a read only memory.

6. A digital signal processor as defined in claim 1, wherein said detection means is constructed of flip-flops.

7. A digital signal processor as defined in claim 1, wherein said detection means includes a random access memory.

8. A digital signal processing method wherein operations of an arithmetic logic unit and data memories are controlled by micro-instructions characterized in that the micro-instructions include load accumulator comparison instructions each of which has bits for describing an operation code and bits for designating a condition code, the method comprising the steps of:
   (1) fetching the micro-instructions, and detecting a value of the condition code designated by the bits for designating the condition code,
   (2) executing a logical operation between the detected value and a decoded value corresponding to the bits for describing the operation code, and
   (3) generating a control signal for the arithmetic logic unit according to a result of the logical operation, thereby causing the arithmetic logic unit to execute either a load accumulator instruction or a no-operation instruction.

9. A digital signal processing method wherein operations of an arithmetic logic unit and data memories are controlled by micro-instructions characterized in that the micro-instructions include load accumulator comparison instructions each of which has bits for describing an operation code and bits for designating a condition code, the method comprising the steps of:
   (1) fetching the micro-instructions, and detecting a value of the condition code designated by the bits for designating the condition code,
   (2) executing a logical operation between the detected value and a decoded value corresponding to the bits for describing the operation code, and
   (3) generating a control signal for the arithmetic logic unit according to a result of the logical operation, thereby causing the arithmetic logic unit to execute either a load accumulator instruction or a no-operation instruction, wherein:
   the bits for designating the condition code consist of a group of bits for designating a device number of a condition code register, and a single bit for designating whether a true value or a false value of the condition code register is to be detected; and the condition code register is designated with the group of bits, while the true or false value of the register is detected with the single bit.

10. A digital signal processing method wherein operations of an arithmetic logic unit and data memories are controlled by micro-instructions characterized in that the micro-instructions include load accumulator comparison instructions each of which has bits for describing an operation code and bits for designating a condition code, the method comprising the steps of:
   (1) fetching the micro-instructions, and detecting a value of the condition code designated by the bits for designating the condition code,
   (2) executing a logical operation between the detected value and a decoded value corresponding to the bits for describing the operation code is executed, and (3) generating a control signal for the arithmetic logic unit according to a result of the logical operation, thereby causing the arithmetic logic unit to execute either a load accumulator instruction or a no-operation instruction, wherein:

the bits for designating a condition code consist of a group of bits for designating a device number of a condition code register, and a single bit for designating whether a true value or a false value of the condition code register is to be detected and the group of bits are decoded to designate the condition code register, while the true or false value of the register is detected with the single bit.

11. A digital signal processing method wherein operations of an arithmetic logic unit and data memories are controlled by micro-instructions characterized in that the micro-instructions include load accumulator comparison instructions each of which has bits for describing an operation code and bits for designating a condition code, the method comprising the steps of:

(1) fetching the micro-instructions, and detecting a value of the condition code designated by the bits for designating the condition code, (2) executing a logical operation between the detected value and a decoded value corresponding to the bits for describing the operation code is executed, and (3) generating a control signal for the arithmetic logic unit according to a result of the logical operation, thereby causing the arithmetic logic unit to execute either a load accumulator instruction or a no-operation instruction, wherein:

when the result of the logical operation between the detected value of the condition code and the decoded value of the operation code is true, the load accumulator instruction is executed by said arithmetic logic unit, and when the result is the instruction is false the no operation instruction is executed by said arithmetic logic unit.

12. A digital signal processing method wherein operations of an arithmetic logic unit and data memories are controlled by micro-instructions characterized in that the micro-instructions include load accumulator comparison instructions each of which has bits for describing an operation code and bits for designating a condition code, the method comprising the steps of:

(1) fetching the micro-instructions, and detecting a value of the condition code designated by the bits for designating the condition code, (2) executing a logical operation between the detected value and a decoded value corresponding to the bits for describing the operation code is executed, and (3) generating a control signal for the arithmetic logic unit according to a result of the logical operation, thereby causing the arithmetic logic unit to execute either a load accumulator instruction or a no-operation instruction, wherein:

when the result of the logical operation between the detected value of the condition code and the decoded value of the operation code is false the load accumulator instruction is executed by said arithmetic logic unit, and when the result is true the no-operation instruction is executed by said arithmetic logic unit.

13. A digital signal processor including an arithmetic logic unit and data memories which are controlled by micro-instructions, said digital signal processor comprising:

means for decoding specific bits of an operand of the micro-instructions which form a load accumulator comparison instruction;

means for detecting a value of a condition code designated by an output of said decoding means; and control means for executing a logical operation between an output of said detecting means and a decoded value of an operation code of the micro-instructions and for generating a control signal for said arithmetic logic unit based on a result of the logical operation;

wherein:

the specific bits of the operand of the micro-instructions consist of a group of bits for designating the condition code, and a single bit for designating whether a true or false value of the condition code is to be detected;

said decoding means is supplied with the group of bits; and said detecting means is supplied with an output of said decoding means and the single bit thereby to detect the designated true or false value of the condition code.

14. A digital signal processor including an arithmetic logic unit and data memories which are controlled by micro-instructions, said digital signal processor comprising:

means for decoding specific bits of an operand of the micro-instructions which form a load accumulator comparison instructions;

means for detecting a value of a condition code designated by an output of said decoding means; and control means for executing a logical operation between an output of said detecting means and a decoded value of an operation code of the micro-instructions and for generating a control signal for said arithmetic logic unit based on a result of the logical operation;

wherein:

the specific bits of the operand of the micro-instructions consist of a group of bits for designating the condition code, and a single bit for designating whether a true or false value of the condition code is to be detected; and said detecting means detects the designated true or false value of the condition code.

* * * * *